Oct. 18, 1955

M. R. KRASNO

METHOD AND SYSTEM FOR SIGNALLING HAVING SPECTRAL MODULATION

Filed May 31, 1952

2,721,259

Inventor:
Maxwell R. Krasno

By Jack M. Wiseman
Attorney

United States Patent Office 2,721,259

Patented Oct. 18, 1955

2,721,259

METHOD AND SYSTEM FOR SIGNALLING HAVING SPECTRAL MODULATION

Maxwell R. Krasno, Waukesha, Wis., assignor to Raytheon Manufacturing Company, a corporation of Delaware Application May 31, 1952, Serial No. 290,949

6 Claims. (Cl. 250—7)

The present invention relates in general to a method and system for signalling, and more particularly to a method and system for signalling having spectral modulation.

In signalling systems, the conventional systems provide modulation by varying the envelope of the oscillation in accordance with the intelligence being transmitted or by varying the instantaneous frequency in accordance with the intelligence being transmitted. Other systems provide periodic interruptions of the entire signal in accordance with the intelligence being transmitted.

Accordingly, an important object of the present invention is to provide a signalling system having spectral modulation by blocking out a portion of the spectrum in accordance with the intelligence being transmitted.

Another important object is to provide a method of signalling having spectral modulation by obstructing a portion of a band of frequencies in accordance with the intelligence being transmitted.

Another object of the present invention is to provide a system and method for the transmission of information wherein the transmission of energy by a group of wave motions having varied wavelengths has a portion thereof blocked out in accordance with the intelligence being transmitted.

Another object of the present invention is to provide a light beam signalling system and method having spectral modulation for transmitting information.

Another object of the present invention is to provide a signalling system and method for transmitting information wherein a portion of the band of light frequencies is obstructed in accordance with the intelligence being transmitted.

Another object of the present invention is to provide a signalling system and method wherein a band of electromagnetic frequencies has a portion thereof blocked out in accordance with the intelligence being transmitted.

Other objects and features will appear upon further perusal of the detailed description taken in conjunction with the accompanying drawing in which.

The present invention provides a method and system for signalling wherein the energy transmitted by a group of wave motions having varied wavelengths has a portion thereof blocked out or obstructed in accordance with the intelligence being transmitted. The wave motion may be either sound waves or electromagnetic waves, which can be produced in the form of a spectrum.

For providing the modulation any suitable obstructing means, dependent upon the type of wave motion utilized, may be provided which blocks out or obstructs a portion of the band.

For receiving a signal having spectral modulation, any suitable means may be provided which is responsive to the wave form transmitted, positioned to detect the group of wave motions and responsive to a blocked out portion thereof for reproducing the intelligence.

In a preferred embodiment, a polychromatic beam of light is provided which may be either a visible light beam, infra-red beam or any other suitable light beam. The light beam is dispersed into a spectrum to provide a band of light frequencies. A portion of the band of light frequencies is modulated by obstructing means, which may be either in the form of absorption or reflection. The obstructing means may be any suitable filter or opaque object actuated in response to a transducer, such as a sound-powered telephone transmitter. After a portion of the band of light frequencies is blocked out or obstructed, the spectrum is recombined to again provide a light beam, thereby enabling suitable transmission.

For receiving the light beam having a portion thereof blocked out or obstructed, a suitable receiving unit is provided, which disperses the light beam having a portion thereof modulated into a spectrum.

In order to detect the transmitted signal after dispersion, suitable light responsive means are herein provided, such as a photoelectric cell. For reproducing the intelligence into an audible signal, a conventional audio amplifier and sound reproducing mechanism is herein provided. In the event the light responsive means is a fluorescent screen, no amplifier or sound reproducing means is required.

Figure 1:
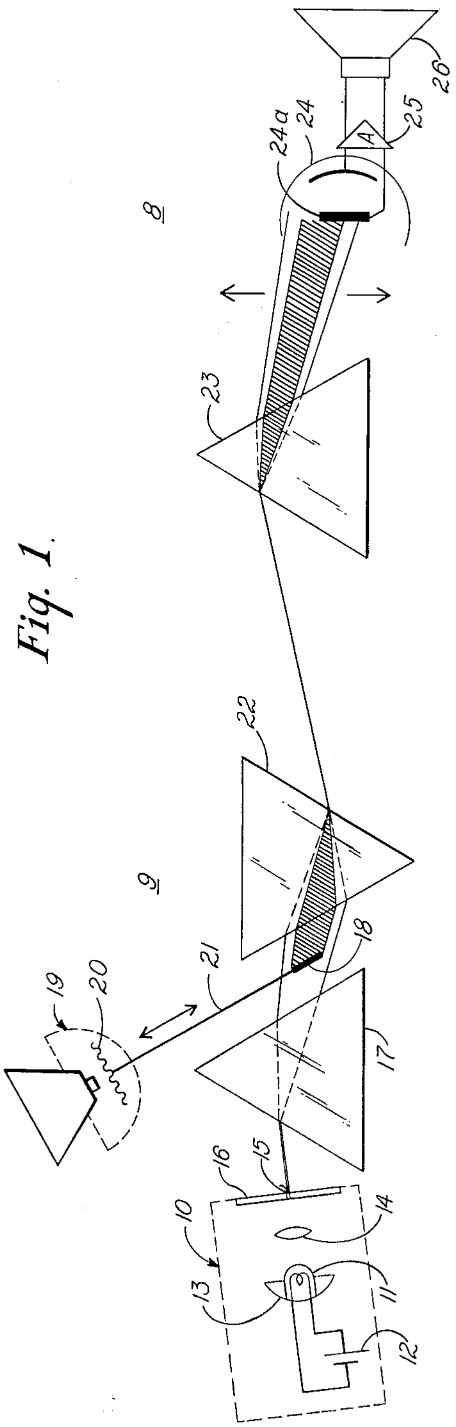
Figure 1 is a schematic diagram of a signalling system embodying the present invention.
Figures 3, 4:
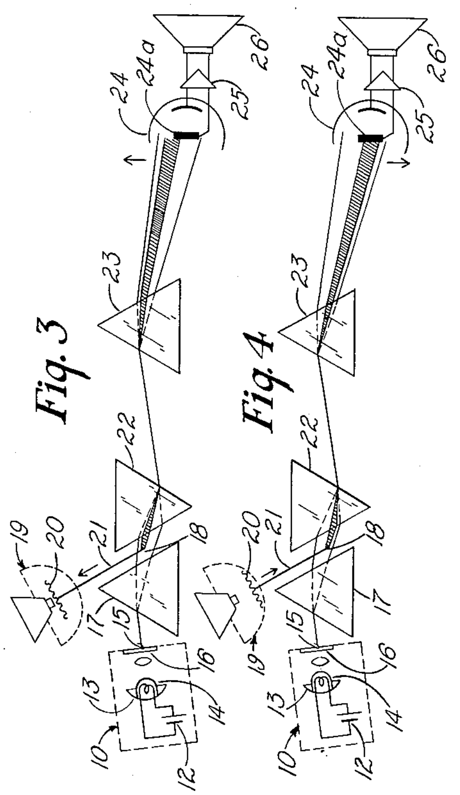
Figure 3 is a schematic diagram of a signalling system embodying the present invention and particularly illustrating the movement of the transducer in one direction for providing modulation.
Figure 4 is a schematic diagram of a signalling system embodying the present invention and particularly illustrating the movement of the transducer in another direction for providing modulation.

Referring now to Figures 1, 3 and 4, for providing a transmitter 9 for the signalling system, a suitable wave motion producing means, such as a polychromatic light beam producing means 10, is provided. The light beam may be a visible light, infra-red light or any other suitable light beam. The light producing means 10 in the preferred embodiment is a portable flashlight comprising a light bulb 11 and battery 12. In the preferred embodiment, the light bulb 11 has a single linear filament wire for projecting the beam into a slit 15 of the dispersing system. For directing the ray of light, a suitable reflector 13 is provided, which, in the preferred embodiment, is a parabolic reflector having the light bulb 11 attached at the center thereof. For providing a concentrated light beam, a converging lens 14 is provided. The light then passes through the suitable narrow slit 15 provided in member 16. In the event infra-red light is desired, a suitable filter is provided, which is positioned between the lens 14 and the member 16.

For dispersing the light beam, after it passes through the slit 15, dispersing means, such as a conventional prism 17, is provided which is made of suitable material, such as glass or quartz. In the event an infra-red source is used, a prism of glass, quartz, silver chloride, or a defraction grating may be utilized to provide for the dispersing of the infra-red light beam. When the narrow slit 15 is illuminated by the light and the issuing beam is refracted through the prism 17, a spectrum emerges from the prism 17 having a band of light frequencies. When the wave motion producing means provides a band of electromagnetic frequencies or a group of sound waves having varied wavelengths, no dispersing means is required.

For providing spectral modulation, a portion of the group of wave motions is obstructed or blocked out by any suitable means, dependent upon the form of wave motions. By way of example, when a group of sound waves is provided, material having a high absorption coefficient may be provided for obstructing or blocking out a portion of the band. When a band of electromagnetic frequencies is provided, a filter may be provided for obstructing or blocking out a portion of the band.

Figure 2:
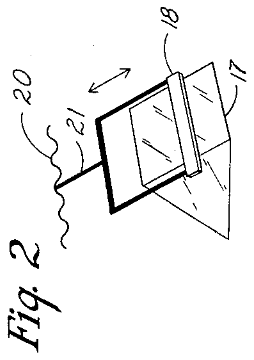
Figure 2 is a perspective view of a modulating means.

In the preferred embodiment for providing spectral modulation of a portion of the band of light frequencies, obstructing means 18, shown in detail in Figure 2, is provided. In the preferred embodiment, the obstructing means 18 may be an opaque object, a filter, or any other suitable means, which blocks out a portion of the band of light frequencies either by absorption or reflection. The obstructing means 18 blocks out a narrow band of frequencies wholly within the spectrum as the blocked out portion moves up and down the spectrum. Therefore, the change in total energy relative to the entire transmitted band is only a second order effect and, accordingly, it is not detectable by ordinary means.

In order to mechanically actuate the obstructing or blocking out means 18, a suitable transducer 19 is provided. In the preferred embodiment, the transducer 19 is similar to the type used in sound-powered telephone transmitters having a movable diaphragm 20. The diaphragm 20 is movable in response to sound energy impressed thereon. Mechanically coupled to the center of the diaphragm 20, as shown in Figure 2, is a movable member 21 secured to the obstructing means 18. When the sound energy is impressed on the diaphragm 20, the movable member 21 is actuated in response to the frequency and intensity of the sound wave output, thereby providing modulation to a portion of the band of light frequencies by actuating the obstructing means 18. Variable positioning of the obstructing means 18 and diaphragm 20 is illustrated in Figures 1, 3 and 4. When a group of sound waves or a band of electromagnetic frequencies is provided, the transducer operates in a similar manner to actuate material having a high absorption coefficient or a filter dependent upon the wave motion.

In the event an amplified signal is required, then the transmitter 19 is connected to a conventional amplifier, which in turn is connected to an electro-mechanical transducer for actuating the member 21.

For enabling the band of light frequencies having a portion thereof modulated to be suitably transmitted, combining means, such as prism 22, is provided which causes the band of light frequencies having a portion thereof modulated to combine. The combining of the band of light frequencies provides a beam of light having a portion thereof modulated in which the intelligence thereof is not detectable by ordinary means. It is to be noted that the light emerging from the prism 22 will be substantially similar in color to the light entering the prism 17, since only a small portion of the light band is blocked by the obstructing means as previously described.

For receiving the band of wave motions having a portion thereof blocked out or obstructed, any suitable means may be provided which is responsive to the wave form transmitted and which is responsive to a blocked out portion thereof for reproducing the intelligence. The receiving unit 8 of the preferred signalling system comprises dispersing means, such as prism 23, made of suitable glass or quartz which disperses the modulated light beam into a spectrum or a band of light frequencies having a portion thereof obstructed. For detecting the signal which is present as a missing portion of the band of light frequencies, suitable detecting means is provided, such as photoelectric cell 24. The photoelectric cell 24, being sensitive to the light rays, will provide variations in current flow to a conventional amplifier in response to variations in light intensity. Accordingly, the portion of the band of frequencies having blocked out modulated portions provide the edge of a shadow moving over the light sensitive element 24*a*, thus producing variations in current flow to the amplifier 25.

For reproducing the transmitted intelligence, suitable means are connected to the amplifier 25, such as sound reproducing means 26. In the event the detecting means is a fluorescent screen, then no amplifier or sound reproducing means is required.

It is to be understood that, although the preferred embodiment provides voice modulation and voice reproduction, other suitable signal reproducing means can be provided, such as lights operating in code or an oscilloscope. Similarly, other suitable signalling means may be provided for actuating the obstructing means, such as telemetering or telegraphic transmitting means.

In operation, a source of polychromatic light is provided by a suitable portable flashlight 10 and is directed in the form of a concentrated light beam into the prism 17. The light is then dispersed into a spectrum of a band of light frequencies. At this point, an operator talks into the transmitter of the transducer 19. The sound energy produced thereby actuates the diaphragm 20, which in turn actuates the obstructing means 18 by means of the member 21, thus providing spectral modulation which follows the voice frequencies. The modulated light beam is recombined by the prism 22, as shown in Figure 1, and is then transmitted.

The modulated light beam is received by the prism 23, which disperses the modulated light beam into a spectrum containing a shadow which corresponds to the band of frequencies blocked out at the transmitter. The photoelectric cell 24 translates this modulated band of light frequencies into a variable current flow depending upon the signal.

In the preferred embodiment, the light sensitive element 24*a* of the photoelectric cell is positioned in such a manner that, when the diaphragm 19 is in a normal position, the center of the blocked portion of the band of frequencies is incident with one edge of the light sensitive element 24*a*, as shown in Figure 1. The signal is amplified by the conventional amplifier 25 and then reproduced into sound by the speaker 26.

Variations and modifications may be effected without departing from the scope of the appended claims.

I claim:

1. In a transmitting system, means providing a polychromatic beam of light, a prism dispersing said beam of light into a band of light frequencies, obstructing means for blocking out a portion of said band of light frequencies for varying the frequency thereof, said obstructing means being in the form of a light impeding element transversely movable between the longitudinal boundaries of said dispersed light beam, but confined between said boundaries in all stages of its transverse movement, a transducer responsive to sound energy, means interconnecting said obstructing means and said transducer for transversely moving said obstructing means in response to sound energy applied to said transducer, a light sensitive element, and means for causing a shadow to move across said light sensitive element at a frequency and amplitude corresponding to the frequency and amplitude of the sound energy applied to said transducer, as represented by the motion imparted to said transversely movable light impeding element.

2. In a transmitting system, means providing a polychromatic beam of light, a prism dispersing said beam of light into a band of light frequencies, obstructing means located entirely within the longitudinal boundaries of said dispersed beam of light for blocking out a portion of said band of light frequencies for varying the frequency thereof, a transducer responsive to sound energy, a diaphragm in said transducer movable in response to sound energy, means consisting of a direct mechanical connection between said obstructing means and said diaphragm for variably positioning said obstructing means in response to sound energy and said obstructing means blocking out a portion of said band of light frequencies in response to the movement of said diaphragm for providing voice frequency modulation, and a prism combining the band of light frequencies having a portion thereof blocked out into a beam of light for transmission.

3. In a signalling system, means providing a polychromatic beam of light, a prism dispersing said beam of light into a band of light frequencies, obstructing means movable transversely of said dispersed light beam but confined within the longitudinal boundaries of said beam for modulating a portion of said band of light frequencies for varying the frequencies thereof, a transducer responsive to sound energy, means interconnecting said obstructing means and said transducer for transversely moving said obstructing means in response to sound energy and said obstructing means locking out a portion of said band of light frequencies in response to sound energy to provide voice frequency modulation, a prism combining the band of light frequencies having a portion thereof modulated into a beam of light for transmission, a prism receiving and dispersing said beam of light having a portion thereof modulated into a band of frequencies, a circuit having a photoelectric cell therein responsive to said band of light frequencies, and means for causing a shadow to move across said photo-electric cell at a frequency and amplitude corresponding to the frequency and amplitude of the sound energy applied to said transducer, said last-named means consisting of that portion of said band of light frequencies embraced by said obstructing means.

4. In a transmitting system, means providing a polychromatic beam of light, a prism dispersing said beam of light into a band of light frequencies, obstructing means for blocking out a portion of said band of light frequencies for varying the frequency thereof, said obstructing means consisting of a light impeding element transversely movable between the longitudinal boundaries of said dispersed light beam and confined within said longitudinal boundaries in all stages of its transverse movement, signal input means controlling the transverse movement of said light impeding element, and signal output means including a light sensitive element and means for applying to said light sensitive element a shadow movable in relation to said light sensitive element in a manner proportional to and dependent upon the transverse movement of said light impeding element.

5. In a signalling system, in combination with a pair of separated light transmitting elements, means for causing a beam of light to traverse the space between said pair of light transmitting elements, a light impeding element disposed transversely of the axis of said beam of light, signal input means, means for moving said light impeding element at a frequency and amplitude corresponding to that of said signal input means, and signal output means including means for generating a signal whose frequency and amplitude are proportional to the frequency and amplitude of movement imparted to said light impeding element by said signal input means.

6. A signalling system as defined in claim 5, wherein one of said pair of light transmitting elements is constituted by a prism operating to disperse a received beam of light, and wherein the other of said pair of light transmitting elements is constituted by a prism operating to cause convergence of said dispersed beam of light.

References Cited in the file of this patent

UNITED STATES PATENTS

| | | |
|---|---|---|
| 1,854,003 | Tischner et al. | Apr. 12, 1932 |
| 1,997,628 | Chubb | Apr. 16, 1935 |
| 2,423,254 | Rettinger | July 1, 1947 |
| 2,443,258 | Lindenblad | June 15, 1948 |
| 2,648,249 | Canada | Aug. 11, 1953 |

FOREIGN PATENTS

| | | |
|---|---|---|
| 489,357 | Great Britain | Sept. 13, 1938 |